United States Patent
Folke et al.

(10) Patent No.: US 10,154,503 B2
(45) Date of Patent: Dec. 11, 2018

(54) NETWORK NODE, WIRELESS DEVICE, METHODS THEREIN, COMPUTER PROGRAMS AND COMPUTER-READABLE MEDIUMS COMPRISING THE COMPUTER PROGRAMS, FOR ADAPTING AND ADOPTING, RESPECTIVELY, AN ALLOCATION OF RADIO RESOURCES

(71) Applicant: Telefonaktiebolaget LM Ericsson (Publ), Stockholm (SE)

(72) Inventors: Mats Folke, Vällingby (SE); Stefano Sorrentino, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 91 days.

(21) Appl. No.: 15/113,337

(22) PCT Filed: Jan. 27, 2014

(86) PCT No.: PCT/SE2014/050100
§ 371 (c)(1),
(2) Date: Jul. 21, 2016

(87) PCT Pub. No.: WO2015/112068
PCT Pub. Date: Jul. 30, 2015

(65) Prior Publication Data
US 2017/0034834 A1  Feb. 2, 2017

(51) Int. Cl.
*H04W 72/04* (2009.01)
*H04W 72/08* (2009.01)
(Continued)

(52) U.S. Cl.
CPC ........ *H04W 72/082* (2013.01); *H04W 8/005* (2013.01); *H04W 76/14* (2018.02); *H04W 76/23* (2018.02)

(58) Field of Classification Search
None
See application file for complete search history.

(56) References Cited

U.S. PATENT DOCUMENTS

2007/0293225 A1*  12/2007  Kangude ............. H04W 36/165
                                                                  455/436
2010/0093364 A1   4/2010  Ribeiro et al.
(Continued)

FOREIGN PATENT DOCUMENTS

EP         2 665 321 A1   11/2013
WO       2013028044 A2    2/2013
(Continued)

OTHER PUBLICATIONS

International Search Report and Written Opinion dated Oct. 14, 2014 for International Application Serial No. PCT/SE2014/050100, International Filing Date—Jan. 27, 2014 consisting of 14-pages.
(Continued)

*Primary Examiner* — Chi H Pham
*Assistant Examiner* — Shick C Hom
(74) *Attorney, Agent, or Firm* — Christopher & Weisberg, P.A.

(57) ABSTRACT

A method performed by a network node for adapting an allocation of radio resources to at least one wireless device for D2D communications. The at least one wireless device is located in a cell served by the network node. The network node obtains a measurement of interference level on allocated D2D radio resources to the at least one wireless device. The network node also adapts the allocation of radio resources for D2D communications, based on the obtained measurement.

22 Claims, 6 Drawing Sheets

(51) Int. Cl.
*H04W 76/14* (2018.01)
*H04W 8/00* (2009.01)
*H04W 76/23* (2018.01)

(56) References Cited

U.S. PATENT DOCUMENTS

| | | | |
|---|---|---|---|
| 2010/0311452 A1* | 12/2010 | Li | H04W 72/08 455/509 |
| 2013/0322277 A1 | 12/2013 | Vanganuru et al. | |
| 2015/0119088 A1* | 4/2015 | Lee | H04W 68/02 455/458 |
| 2015/0139006 A1* | 5/2015 | Seo | H04J 11/005 370/252 |
| 2015/0319796 A1* | 11/2015 | Lu | H04B 7/2615 370/330 |
| 2016/0242152 A1* | 8/2016 | Yu | H04W 76/14 |

FOREIGN PATENT DOCUMENTS

| | | |
|---|---|---|
| WO | 2013139041 A1 | 9/2013 |
| WO | 2014089791 A1 | 6/2014 |
| WO | 2014115961 A1 | 7/2014 |

OTHER PUBLICATIONS

3GPP TSG-RAN WG1 Meeting #74, R1-133494, Barcelona, Spain, Title: "D2D Communication within Network coverage," Agenda Item: 7.2.8.1., Source: Nokia, NSN, Document for Discussion and Decision, Aug. 19-23, 2013 consisting of 4-pages.
European Search Report dated Sep. 13, 2017 issued in corresponding European Patent Application No. 4879784.8 consisting of 8-pages.
3GPP TR 22.803 V12.2.0, 3rd Generation Partnership Project; Technical Specification Group Services and System spects; Feasibility Study for Proximity Services (ProSe), (Release 12), Jun. 2013 consisting of 32-pages.

* cited by examiner

NETWORK NODE, WIRELESS DEVICE, METHODS THEREIN, COMPUTER PROGRAMS AND COMPUTER-READABLE MEDIUMS COMPRISING THE COMPUTER PROGRAMS, FOR ADAPTING AND ADOPTING, RESPECTIVELY, AN ALLOCATION OF RADIO RESOURCES

TECHNICAL FIELD

The present disclosure relates generally to a network node and methods therein for adapting an allocation of radio resources to at least one wireless device for Device-to-Device (D2D) communications. The present disclosure also relates generally to the wireless device and methods therein for adopting a reconfiguration of the allocation of radio resources to the at least one wireless device for D2D communications. The present disclosure relates as well to computer programs and computer-readable storage mediums, having stored thereon the computer programs to carry out the aforementioned methods.

BACKGROUND

Communication devices such as wireless device are also known as e.g. User Equipments (UE), mobile terminals, wireless terminals and/or mobile stations. Terminals are enabled to communicate wirelessly in a cellular communications network or wireless communication system, sometimes also referred to as a cellular radio system or cellular networks. The communication may be performed e.g. between two wireless devices, between a wireless device and a regular telephone and/or between a wireless device and a server via a Radio Access Network (RAN) and possibly one or more core networks, comprised within the cellular communications network.

Wireless devices may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In $3^{rd}$ Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

D2D communication is a well-known and widely used component of many existing wireless technologies, including ad hoc and cellular networks. In D2D communications, wireless devices, such as user equipments, that are in the proximity of each other discover one another, in a process referred to as device discovery. They establish a direct link referred to as D2D bearer establishment, rather than a link via a base station. The initiation of the establishment of the D2D link may be made by the radio access network or by any of the wireless devices of the D2D pair. Examples of D2D communications include Bluetooth and several variants of the IEEE 802.11 standards suite such as WiFi Direct. These systems operate in unlicensed spectrum.

Wireless devices that want to communicate, or even just discover each other, typically need to transmit various forms of control signaling. One example of such control signaling is the so-called signal or discovery signal, which may possibly include a full message. The signal carries at least carries some form of device identity and is transmitted by a wireless device that wants to be discoverable by other wireless devices. Other wireless devices may scan for the discovery signals. Once they have detected the discovery signal, they may take the appropriate action, for example to try to initiate a connection setup with the device transmitting the discovery message.

Multiple discovery signals from different wireless devices are multiplexed on the same radio resources in a combination of Time Division Multiplexing (TDM), Frequency-Division Multiplexing (FDM) and possibly Code Division Multiplexing (CDM). Even though details are not agreed yet, it is likely that discovery signals may be multiplexed on specific subframes occurring at known, or signaled, positions in the radio frame. Such subframes carrying at least discovery signals are called discovery subframes in the following.

So far, 3GPP RAN1#73 R1-132861 has agreed to study further the following options for scheduling discovery signals:

Type 1: A discovery procedure where resources for discovery signal transmission are allocated on a non-wireless device specific basis, e.g., non-UE specific basis,
  Note: Resources may be for all wireless devices or group of wireless devices.
Type 2: A discovery procedure where resources for discovery signal transmission are allocated on a per wireless device specific basis.
  Type 2A: Resources are allocated for each specific transmission instance of discovery signals.
  Type 2B: Resources are semi-persistently allocated for discovery signal transmission.

While type-1 and type-2 were defined, so far there is no agreement about when to use which type.

Recently, D2D communications as an underlay to cellular networks have been proposed as a means to take advantage of the proximity of communicating wireless devices and, at the same time, to allow wireless devices to operate in a controlled interference environment. Typically, it is suggested that such D2D communication shares the same spectrum as the cellular system, for example by reserving some of the cellular uplink resources for D2D purposes. Allocating dedicated spectrum for D2D purposes is a less likely alternative, as spectrum is a scarce resource and, dynamic, sharing between the D2D services and cellular services is more flexible and provides higher spectrum efficiency.

SUMMARY

It is an object of embodiments herein to improve the performance in a radio communications network by providing an improved way for a network node to allocate radio resources to at least one wireless device for D2D communications.

According to a first aspect of embodiments herein, the object is achieved by a method performed by a network node. The method is for adapting an allocation of radio resources to at least one wireless device for D2D communications. The at least one wireless device is located in a cell served by the network node. The network node obtains a measurement of interference level on allocated D2D radio resources to the at least one wireless device. The network node adapts the allocation of radio resources for D2D communications, based on the obtained measurement.

According to a second aspect of embodiments herein, the object is achieved by a method performed by the wireless device. The method is for adopting a reconfiguration of the allocation of radio resources to the at least one wireless device for D2D communications. The wireless device is located in the cell served by the network node. The wireless device receives from the network node the reconfiguration of the allocation of radio resources for D2D communications. The reconfiguration is based on the measurement of interference level on allocated D2D radio resources to the at least one wireless device obtained by the network node. The wireless device adopts the received reconfiguration of the allocation of radio resources for D2D communications.

According to a third aspect of embodiments herein, the object is achieved by the network node for adapting the allocation of radio resources to the at least one wireless device for D2D communications. The at least one wireless device is configured to be located in the cell configured to be served by the network node. The network node is configured to obtain the measurement of interference level on the allocated D2D radio resources to the at least one wireless device. The network node is further configured to adapt the allocation of the radio resources for D2D communications, based on the obtained measurement.

According to a fourth aspect of embodiments herein, the object is achieved by the wireless device for adopting the reconfiguration of the allocation of radio resources to the at least one wireless device for D2D communications. The wireless device is configured to be located in the cell configured to be served by the network node. The wireless device is configured to receive from the network node the reconfiguration of the allocation of radio resources for D2D communications. The reconfiguration is based on the measurement of interference level on allocated D2D radio resources to the at least one wireless device configured to be obtained by the network node. The wireless device is also configured to adopt the received reconfiguration of the allocation of radio resources for D2D communications.

According to a fifth aspect of embodiments herein, the object is achieved by a computer program, comprising instructions which, when executed on at least one processor, cause the at least one processor to carry out the method performed by the network node.

According to a sixth aspect of embodiments herein, the object is achieved by a computer-readable storage medium, having stored thereon the computer program, comprising instructions which, when executed on at least one processor, cause the at least one processor to carry out the method performed by the network node.

According to a seventh aspect of embodiments herein, the object is achieved by a computer program, comprising instructions which, when executed on at least one processor, cause the at least one processor to carry out the method performed by the wireless device.

According to an eighth aspect of embodiments herein, the object is achieved by a computer-readable storage medium, having stored thereon the computer program, comprising instructions which, when executed on at least one processor, cause the at least one processor to carry out the method performed by the wireless device.

By the network node obtaining the measurement of interference level on the allocated D2D radio resources to the at least one wireless device, it may be able to adapt the radio resources allocated for D2D communications to the detected load on D2D resources. This provides for a low complexity and low overhead method to optimize spectrum efficiency. For example, if the usage of D2D communications is low, not as many radio resources may be allocated to D2D communications, and they may instead be used for cellular communications, and vice versa.

Further advantages of some embodiments disclosed herein are discussed below.

BRIEF DESCRIPTION OF THE DRAWINGS

Examples of embodiments herein are described in more detail with reference to attached drawings in which.

DETAILED DESCRIPTION

Figure 1:
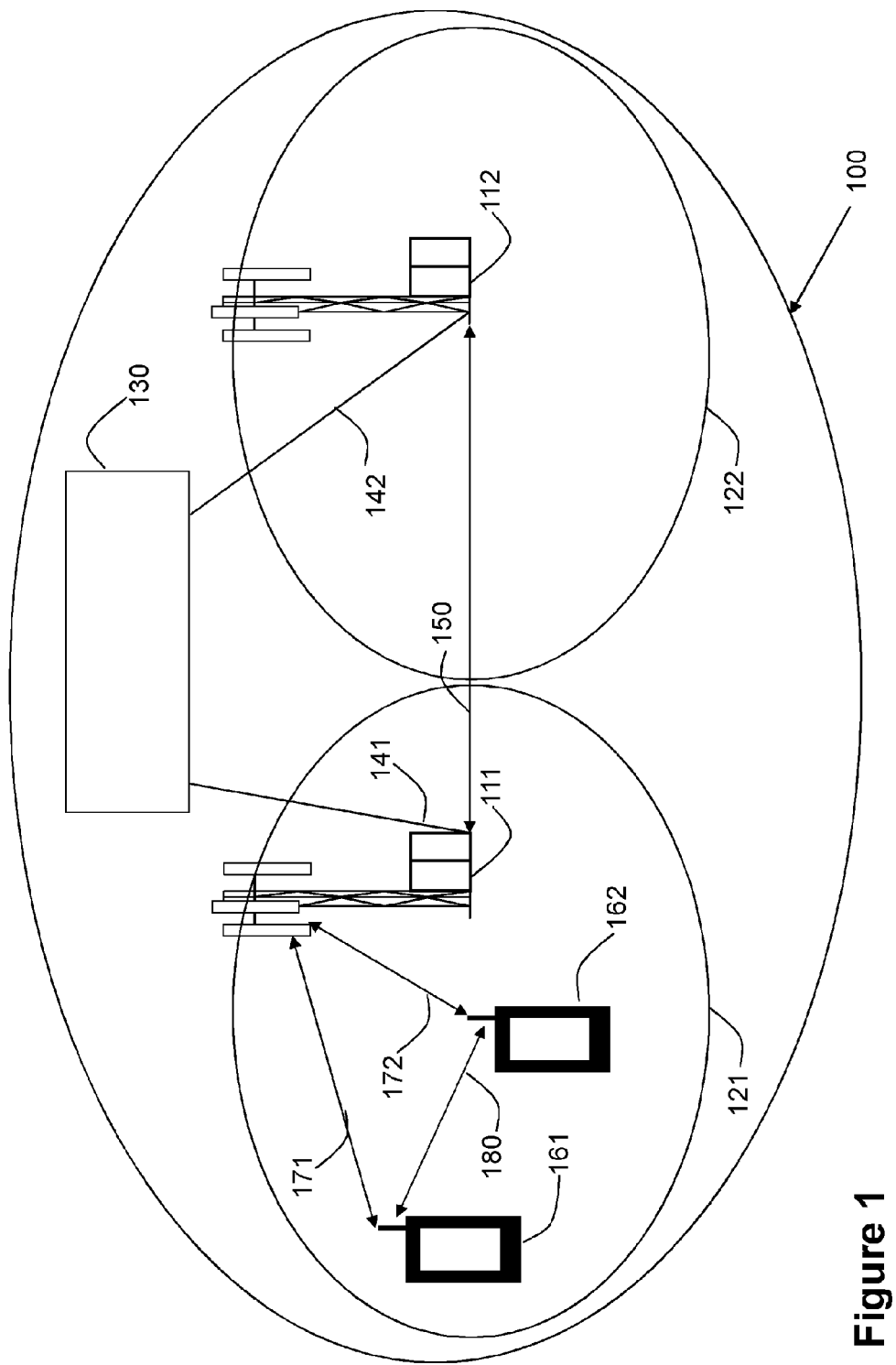
FIG. 1 is a schematic block diagram illustrating embodiments in a radio communications network, according to embodiments herein.

As part of developing embodiments herein, one or more problems that may be associated with use of at least some of the prior art solutions, and that may addressed by embodiments herein will first be identified and discussed.

When a wireless device is in Radio Resource Control (RRC)_CONNECTED mode, the Evolved Universal Terrestrial Radio Access Network (E-UTRAN) tracks the position of the wireless device at a cell level, i.e. the E-UTRAN knows in which cell the wireless device is located and thus which network node, e.g., eNB, the wireless device is connected to. This means that the network node may determine the amount of resources needed for various services and how to prioritize among these.

When a wireless device is in RRC_IDLE mode, the position of the wireless device may be tracked on Tracking Area (TA)-level. Typically, a TA is made up of several cells. Each cell broadcasts which TA it is part of and when a wireless device changes TA, i.e., when it moves into a cell in a new TA, the wireless device performs a Tracking Area Update (TAU). If a wireless device moves between cells of the same TA, no TAU is performed.

The TAU is a procedure performed between a wireless device and a Core Network (CN), such as a Mobility Management Entity (MME) in the CN. Thus, the network node has no knowledge of the number of RRC_IDLE wireless devices in its cell. This means that the network node cannot determine the amount of resources needed for the RRC_IDLE wireless devices. As the design in LTE is for wireless devices in RRC_IDLE to consume as little resources as possible, this is typically not a problem. However, with the introduction of D2D services, wireless devices in RRC_IDLE may perform D2D Discovery or D2D Communication, which consumes resources for the network node.

RRC_idle wireless devices may participate in D2D communication, including transmission of direct signals/channels. The network node is unaware of the number of camping RRC_idle wireless devices and it is not even aware of how many of such wireless devices participate to D2D. The network node is unable to optimize D2D resource allocation without such load information.

Thus, with existing solutions, the network node is not able establish to sufficiently well how many wireless devices are using resources reserved for D2D in a cell.

Embodiments described herein have the advantage that the network node may convey information about the load of the D2D resources in a low complexity and low overhead method. In some embodiments, the network node may measure the received, i.e., detected, energy on the resources associated with D2D transmission and may adapt the amount of resources allocated for D2D also based on such measurement.

Embodiments will now be described more fully hereinafter with reference to the accompanying drawings, in which examples of the claimed subject matter are shown. The claimed subject matter may, however, be embodied in many different forms and should not be construed as limited to the embodiments set forth herein. Rather, these embodiments are provided so that this disclosure will be thorough and complete, and will fully convey the scope of the claimed subject matter to those skilled in the art. It should also be noted that these embodiments are not mutually exclusive. Components from one embodiment may be tacitly assumed to be present/used in another embodiment.

FIG. 1 depicts a radio communications network 100, sometimes also referred to as a cellular radio system, cellular network or wireless communications system, in which embodiments herein may be implemented. The radio communications network 100 may for example be a network such as a Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, Global System for Mobile communications (GSM) network, GSM/Enhanced Data Rate for GSM Evolution (EDGE) Radio Access Network (GERAN) network, Ultra-Mobile Broadband (UMB) EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), 5G system or any cellular network or system. Thus, although terminology from 3GPP LTE may be used in this disclosure to exemplify embodiments herein, this should not be seen as limiting the scope of the embodiments herein to only the aforementioned system.

The radio communications network 100 comprises a network node 111, and neighbor network node 112, which is another network node that is neighbor to network node 111. Each of the network node 111 and the neighbor network node 112 may be, for example, base stations such as e.g., an eNB, eNodeB, or a Home Node B, a Home eNode B, femto Base Station, BS, pico BS or any other network unit capable to serve a wireless device or a machine type communication device in a radio communications network 100. In some particular embodiments, the network node 111 and the neighbor network node 112 may be a stationary relay node or a mobile relay node.

The radio communications network 100 covers a geographical area which is divided into cell areas, wherein each cell area is served by a network node, although, one network node may serve one or several cells. In the non-limiting example depicted in FIG. 1, the network node 111 serves a first cell 121, also referred to herein as the cell 121, and the neighbor network node 112 serves a second cell 122. Each of the network node 111 and the neighbor network node 112 may be of different classes, such as, e.g., macro eNodeB, home eNodeB or pico base station, based on transmission power and thereby also cell size. Typically, radio communications network 100 may comprise more cells similar to the first cell 121 and the second cell 122, served by their respective network node. This is not depicted in FIG. 1 for the sake of simplicity. Each of the network node 111 and the neighbor network node 112 may support one or several communication technologies, and its name may depend on the technology and terminology used. In 3GPP LTE, the network node 111 and the neighbor network node 112, which may be referred to as eNodeBs or even eNBs, may be directly connected to one or more core networks 130. The network node 111 and the neighbor network node 112 may communicate with the one or more core networks 130 over a first link 141 and over a second link 142, respectively. The network node 111 may communicate with the neighbor network node 112 over a first link 150.

A number of wireless devices are located in the radio communications network 100. In the example scenario of FIG. 1, only two wireless devices are shown, a first wireless device 161, also referred to herein as "the wireless device 161" or "one wireless device 161", and a second wireless device 162. Each of the first wireless device 161 and the second wireless device 162 is a wireless communication device such as a UE, which is also known as e.g., mobile terminal, wireless terminal, mobile station, mobile telephone, and/or cellular telephone. Further examples of different wireless devices include laptops with wireless capability, modems, Personal Digital Assistants (PDA), or tablet computers, sometimes referred to as a surf plates with wireless capability, Machine-to-Machine (M2M) devices, devices equipped with a wireless interface, such as a printer or a file storage device, Machine Type Communication (MTC) devices such as sensors, just to mention some examples. Each of the devices is wireless, i.e., it is enabled to communicate, e.g., voice and/or data, wirelessly in the radio communications network 100. The communication may be performed e.g., between two devices, such as between the first wireless device 161 and the second wireless device 162, as described above, between a device and a regular telephone and/or between a device and another entity, such as a server or any other radio network unit capable of communicating over a radio link in the radio communications network 100. The communication may be performed e.g., via a RAN and possibly the one or more core networks 130 comprised within the radio communications network 100.

The first wireless device 161 is located within the cell 121. The first wireless device 161 is configured to communicate within the wireless communications system 100 via the network node 111 over a first radio link 171 when the first wireless device 161 is present in the cell 121 served by the network node 111.

In this example, the second wireless device 162 is also located within the cell 121. However, in other embodiments, the second wireless device 162 may be located within the radio coverage of the first wireless device 161, in another cell which is adjacent to the cell 121. When the second wireless device 162 is present in the cell 121, it is configured to communicate within the radio communications network 100 via the network node 111 over a radio link such as e.g. a second radio link 172. When the second wireless device 162 is present in another cell, e.g., cell 122, it is configured to communicate within the radio communications network 100 via another network node serving the another cell, such as the neighbor node 112 over another radio link similar the second radio link 172.

The first wireless device 161 is capable of communicating with other wireless devices using wireless D2D communication, such as the second wireless device 162, over a D2D link 180. The second wireless device 162 is capable of communicating with other wireless devices using wireless D2D communication, such as the first wireless device 161, over a D2D link such as the D2D link 180, in the case of the second wireless device 162, or a similar D2D link.

Embodiments of a method performed by the network node 111 for adapting an allocation of radio resources to at least one wireless device 161 for D2D communications, will now be described with reference to the flowchart depicted in FIG. 2. As stated earlier, the at least one wireless device 161 is located in the cell 121 served by the network node 111. The first wireless device 161 and the network node 111 operate in the radio communications network 100.

The term "resource", as used herein, is intended to be interpreted in a general way. It may indicate an arbitrary combination of subcarriers, time slots, codes and spatial dimensions.

The allocation of radio resources to the at least one wireless device 161 for D2D communications may be interpreted as the set of resources for certain D2D operations by the at least one wireless device 161, that have been configured, e.g., preconfigured, by the network node 111. The radio resources comprised in the allocation may be referred to herein as the allocated D2D radio resources to the at least one wireless device 161. For example, this means that the allocation of radio resources to at least one wireless device 161 for D2D communications may encompass different resources sets, such as A+B+C+D, wherein, e.g. radio resource set A may be used by the wireless device 161, and, e.g., radio resource set B may be empty.

The network node 111 may configure these resources for D2D operations in a wireless device-specific or non-wireless device-specific fashion, e.g., in a wireless device 161-specific or non-wireless device 161-specific fashion. The wireless device 161 may use non-wireless device 161-specific resources in a contention-based fashion, possibly based on distributed resource allocation algorithms.

In some embodiments, the wireless device 161 may be in idle mode, such as in RRC_idle mode. It may be assumed that the wireless device 161, even when it is RRC_idle, may be able to transmit D2D signals in the pre-configured resources, where the pre-configuration may be managed by the network node 111. The same may apply, in general, to wireless devices such as wireless device 161, without an active network node connection. Such wireless devices may be unable to communicate with the network node 111. The resources may also be configured in a semi-static fashion using System Information that the wireless devices in RRC_IDLE, such as the wireless device 161 when in RRC_idle mode, may be obliged to track.

RRC_connected wireless devices, such as wireless device 161 when in RRC_connected mode, may, however, be assigned resources for transmission directly by the network node 111.

Figure 2:
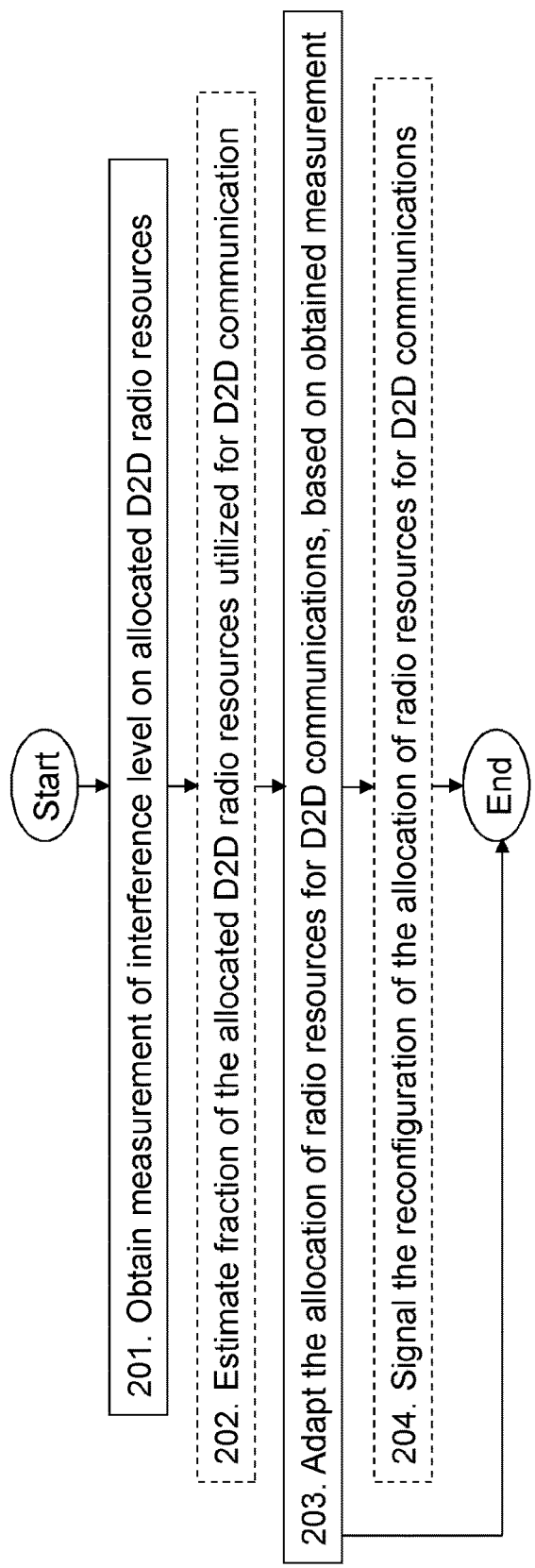
FIG. 2 is a flowchart depicting embodiments of a method in a network node, according to embodiments herein.

FIG. 2 depicts a flowchart of the actions that are or may be performed by the network node 111 in embodiments herein. In the Figure, a box with dashed lines indicates that the action is optional.

The method may comprise the following actions, which actions may as well be carried out in another suitable order than that described below. In some embodiments, all the actions may be carried out, whereas in other embodiments only some action/s may be carried out.

Action 201

In order for the network node 111 to optimize D2D resource allocation according to the load of D2D resources, the network node 111 obtains a measurement of interference level on allocated D2D radio resources to the at least one wireless device 161.

"A measurement" on allocated D2D radio resources to the at least one wireless device 161 is understood herein as any one measurement of the radio resources in the allocation of radio resources to at least one wireless device 161 for D2D communications. These resources, as stated earlier, may encompass different resources sets, such as A+B+C+D, wherein, e.g. radio resource set A may be used by the wireless device 161, and, e.g., radio resource set B may be empty. Thus, the measurement, as understood herein, may encompass any measurement of A+B+C+D, such as a measurement of A, or a measurement of B. That is, for example, if the wireless device 161 uses resource set A, the network node 111 may obtain the measurement on resource set B.

The measurement may comprise at least one energy measurement or at least one signal detection on individual resources in order to estimate a fraction of resources that is utilized for D2D in the radio communications network 100.

In some embodiments, obtaining the energy measurement may comprise measuring an energy level received on the considered resources. Thus, in some embodiments, the measurement may comprise an energy level received by the network node 111 or the wireless device 161 on the allocated D2D radio resources. In some embodiments, the energy level may be a Reference Signal Received Power (RSRP).

In some embodiments, the measurement may comprise a signal detected by the network node 111 or by the wireless device 161 in the allocated D2D radio resources. The signal detected may comprise the energy or intensity level associated to a certain specific signal, e.g., a reference signal, is measured on the considered resources. Additional or alternative measurements may be performed at higher layers, including detection of Cyclic Redundancy Check (CRC) when decoding the D2D messages.

In some embodiments, the obtaining the measurement may comprise receiving a report from the wireless device 161 which report indicates the energy level received by the wireless device 161 on the allocated D2D radio resources, or the signal detected by the wireless device 161 in the allocated D2D radio resources. This may be implemented by, for example, receiving the report in a control message from the wireless device 161.

In some of these embodiments, the network node 111 may first configure the wireless device 161 to send to the network node 111 the report comprising the energy level received by the wireless device 161 on the allocated D2D radio resources, or the signal detected by the wireless device 161 in the allocated D2D radio resources. This may be implemented by, for example, sending an RRC message to the wireless device 161.

The measurement of interference according to any of the embodiments herein, may result, in some embodiments, in a value or a range of values corresponding to no interference, or negligible interference, according to one or more determined thresholds. While other values or range of values resulting from the measurement of interference, may be considered to correspond to problematic interference or different degrees of problematic interference.

At least for certain types of D2D communication, interference sensing at the transmitter may not provide an accurate indication of which resources are free from interference at the receiver/s. However, under the assumption that the D2D interference load is approximately constant over relatively large geographical areas, e.g., the cell 121, interference sensing for traffic load measurement may not necessarily need to be performed at the transmitter, but it may be performed at any node, including the network node 111.

Thus, in some embodiments, the obtaining the measurement may comprise the network node 111 measuring the energy level received on a number of allocated D2D radio resources, or detecting the signal in the allocated D2D radio resources.

Action 202

Since not all the allocated D2D radio resources may actually be utilized, the network node 111 may estimate a fraction of the allocated D2D radio resources that is utilized for D2D communication in the radio communications network 100, wherein the network node 111 and the wireless device 161 operate. This action may allow the network node 111 to assess if and how much the allocation of radio resources to the at least one wireless device 161 for D2D communications may be changed, based on interference.

Action 203

The network node 111 adapts the allocation of radio resources for D2D communications, based on the obtained measurement.

In some embodiments, the adapting may comprise one of: increasing a number of radio resources available for D2D traffic, and reducing the number of radio resources available for D2D traffic.

Following the example provided earlier, if the wireless device 161 uses resource set A, and the network node 111 obtains a measurement on resource set B, and finds out that B is empty, the network node 111 may allocate to A+B to the wireless device 161.

The network node 111 may need to perform a number of Radio Resource Management (RRM) operations in order to perform efficient resource allocation. In particular, the balance between allocated D2D resources and cellular resources may be a function of the traffic load and interference scenarios for respectively D2D and cellular traffic, since D2D and cellular may share resources from the same radio carrier.

Thus, in some embodiments, the adapting may also further comprise one of: increasing a number of radio resources available for legacy cellular traffic, and reducing the number of radio resources available for legacy cellular traffic.

In some embodiments, a use case for D2D may be for Public Safety users. A typical scenario may be to respond to a fire or a traffic incident. Due to the very nature of these scenarios, they may not be known in advance. Therefore, it may be of importance that the RRM operations mentioned earlier, i.e. that the balancing of resources between D2D and legacy cellular traffic, are performed swiftly.

The network node 111, may take any of the following actions as a way to increase the resources for legacy cellular traffic, although the list is non-exhaustive:
Assigning a new carrier
Changing various parameters related to scheduling
Start scheduling users on resources previously refrained from scheduling on
Use a less robust Modulation and Coding Scheme (MCS)
Increasing carrier bandwidth The network node 111, may take any of the following actions as a way to decrease the resources for legacy cellular traffic, although the list is non-exhaustive:
Withdrawing a deployed carrier
Changing various parameters related to scheduling
Stop schedule users on resources previously scheduled on
Use a more robust MCS
Decreasing carrier bandwidth In some embodiments, the network node 111 may detect the fraction of resources that are occupied, according to energy and/or signal detection criteria, and adjust resource allocation accordingly. Thus, in some embodiments, the adapting may be further based on the estimated fraction, as described in action 202. That is, if the fraction of resources used for D2D transmission over the total amount of resources assigned for D2D transmission is below or above certain thresholds, the network node 111 may reconfigure the D2D resources in order to respectively reduce and increase the amount of resources available for D2D transmission.

In any of the embodiments herein, the allocation of radio resources to the at least one wireless device 161 may be for scheduling discovery signals with at least one of the following types: a) Type 1, wherein radio resources for discovery signal transmission are allocated on a non-wireless device specific basis, b) Type 2, wherein radio resources for discovery signal transmission are allocated on a wireless device specific basis, c) Type 2A, wherein radio resources for discovery signal transmission are allocated for each specific transmission instance of discovery signals, and d) Type 2B, wherein radio resources for discovery signal transmission are semi-persistently allocated for discovery signal transmission.

Action 204

The network node 111 may signal to the wireless device 161 or the neighbor network node 112 a reconfiguration of the allocation of radio resources for D2D communications. The reconfiguration may be based on the adapted allocation of radio resources for D2D communications. The reconfiguration of D2D and cellular resources may be signalled to the wireless device 161, as well as to other wireless devices, by, e.g., using system information, e.g., when the wireless device 161 is in idle mode, or dedicated RRC communication, e.g., when the wireless device 161 is in RRC_connected mode, PDCCH, ePDCCH, etc. . . . . .

"A reconfiguration of the allocation of radio resources for D2D communications" is understood herein as any one reconfiguration of the allocation of radio resources to at least one wireless device 161 for D2D communications. These resources, as stated earlier, may encompass different resources sets, such as A+B+C+D, wherein, e.g. radio resource set A may be used by the wireless device 161, and, e.g., radio resource set B may be empty. Thus, the reconfiguration, as understood herein, may encompass any reconfiguration of any of the group A+B+C+D, such as a reconfiguration of A, or a reconfiguration of A+B+C+D. That is, for example, if the wireless device 161 uses resource set A, the network node 111 may signal a reconfiguration of A or a reconfiguration of A+B+C+D.

The network node 111 may communicate the resources reconfiguration or information about D2D load measurements to neighbour network nodes, such as the network node 112 e.g., by X2 or OAM. As stated earlier, the neighbor network node 112 operates in the radio communications network 100.

Figure 3:
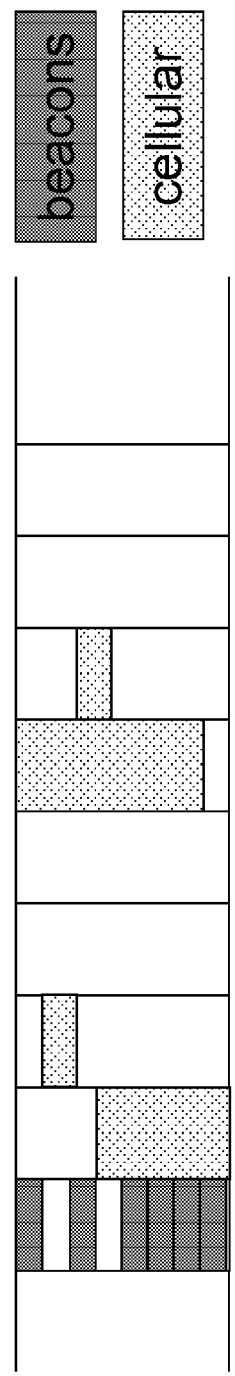
FIG. 3 is schematic diagram illustrating FDM mapping of D2D resources in selected subframes, according to embodiments herein.

In the description herein, FDM mapping of the D2D resources in selected subframes may be assumed, in a not limiting way, as shown in FIG. 3. FIG. 3 illustrates FDM mapping of D2D transmissions, where multiple discovery messages, i.e., beacons, are mapped on different resources in the frequency domain, within the same radio subframe. The vertical lines in the Figure mark the different subframes. The horizontal axis indicates time and the vertical axis represents the frequency domain. Additionally, some cellular transmissions are shown and occur in other subframes, e.g., TDM between D2D and cellular. Nevertheless, a fraction of the D2D subframes can potentially be allocated to cellular transmission, such that the resources assigned to D2D consist of a fraction of a subframe. It is in general preferable to avoid sharing the same resource between cellular and D2D in order to avoid uncontrollable interference. However, most of the principles and techniques described herein may be applied to different resources multiplexing techniques, such as CDM and TDM.

In any of the embodiments described herein, certain D2D signals/channels may have a broadcast nature and the position and number of potential receivers may not be known or controlled by any node prior to the actual transmission. In this case, the transmitter wireless device, such as the wireless device 161, should ideally choose resources that are not interfered at its potential, i.e., unknown, receivers.

Other signals or messages may be unicast or groupcast, i.e., they may target a limited number of receivers. In this case, the interference scenario at the selected receivers may be possibly conveyed to the transmitter wireless device, such as the wireless device 161, in order to optimize resource allocation.

Embodiments of a method performed by the wireless device 161 for adopting the reconfiguration of the allocation of radio resources to the at least one wireless device 161 for D2D communications, will now be described with reference to the flowchart depicted depicted in FIG. 4. As stated earlier, the wireless device 161 is located in the cell 121 served by the network node 111. The first wireless device 161 and the network node 111 operate in the radio communications network 100, as also stated earlier. In some embodiments, the wireless device 161 may be in idle mode.

Figure 4:
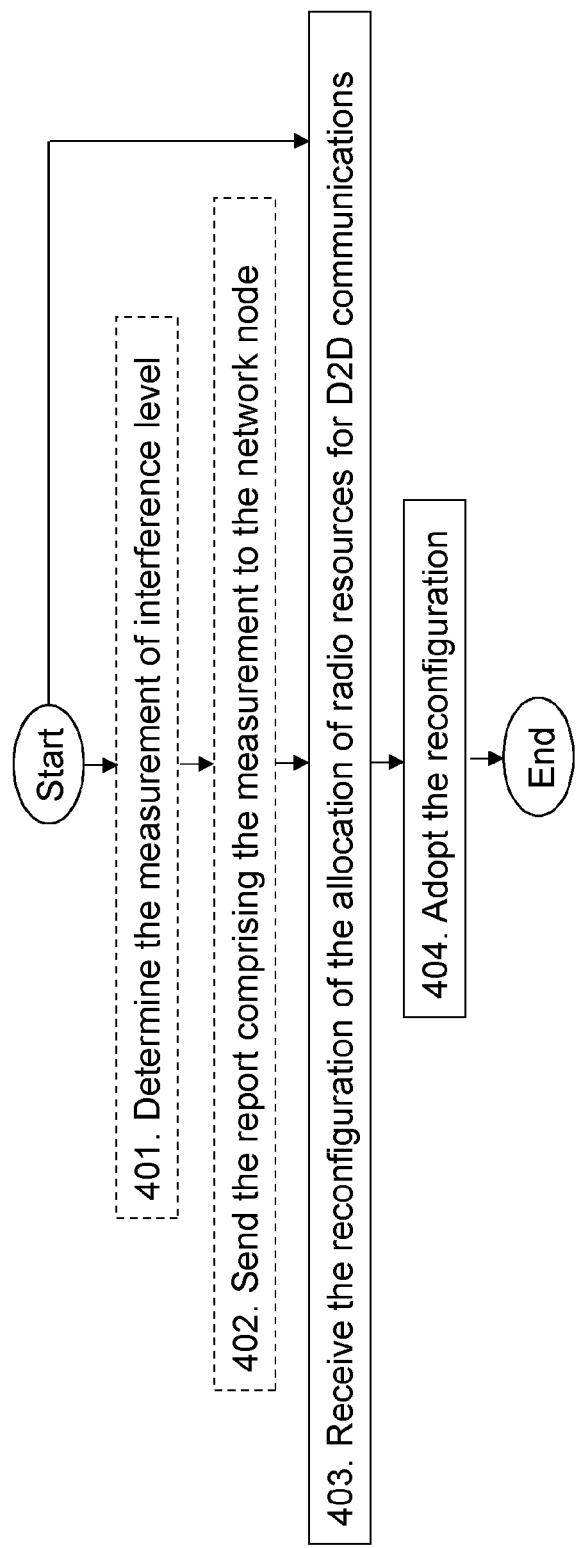
FIG. 4 is a flowchart depicting embodiments of a method in a wireless device, according to embodiments herein.

FIG. 4 depicts a flowchart of the actions that are or may be performed by the first wireless device 161 in embodiments herein. In the Figure, a box with dashed lines indicates that the action is optional.

The method may comprise the following actions, which actions may as well be carried out in another suitable order than that described below. In some embodiments, all the actions may be carried out, whereas in other embodiments only some action/s may be carried out.

The detailed description of some of the following corresponds to the same references provided above, in relation to the actions described for the network node 111, and will thus not be repeated here. For example, the term "resource", as used herein, may indicate an arbitrary combination of sub-carriers, time slots, codes and spatial dimensions. As another example, the reconfiguration is defined as described in action 204.

Action 401

As described earlier, in some embodiments, one or more D2D enabled wireless devices 161 may measure the load experienced on D2D resources and then report it to the network node 111, as will be described in Action 402.

The wireless device 161 may receive the configuration from the network node 111 to send to the network node 111 the report comprising the measurement of interference level on allocated D2D radio resources to the at least one wireless device 161. This may be implemented by, for example, by receiving the RRC message from the network node 111, described in Action 201.

Such reporting may be triggered or configured by the network node 111 in different ways. In some examples, the network node 111 may configure the wireless devices 161 when it is far away from the network node 111, or close to the edge of cell 221 to feedback information regarding D2D load. This may be, e.g., because the network node 111 may not be able to measure the D2D load experienced by the wireless device 111 at the edge of cell 221.

The measurement performed by the wireless device 161 may take similar forms as the measurement described for the network node 111 in action 201. That is, the measurement may comprise the measured energy level received by the wireless device 161 on the allocated D2D radio resources, or the signal detected by the wireless device 161 in the allocated D2D radio resources.

Thus, in some embodiments, the wireless device 131 may determine the measurement of interference level by one of: measuring the energy level received on the number of allocated D2D radio resources, or detecting the signal described in action 201, e.g., a reference signal, in the allocated D2D radio resources.

The wireless device 161 may measure the energy level received on the number of allocated D2D radio resources, for example, by estimating a signal power level associated to the number of allocated D2D radio resources.

The wireless device 161 may detect the signal in the allocated D2D radio resources, for example, by detecting an energy associated to reference signals potentially transmitted by wireless devices on those resources or by attempting detection of the transmissions occurring over those resources.

Action 402

The wireless device 161 may send the report comprising the measurement, as described in Action 201, to the network node 111. This may be implemented by, for example, sending the report in the control message to the network node 111, as also described in action 201.

Action 403

The wireless device 161 receives the reconfiguration of the allocation of radio resources for D2D communications from the network node 111, as described in action 204. The reconfiguration is based on the measurement of interference level on allocated D2D radio resources to the at least one wireless device 161 obtained by the network node 111.

In some embodiments, the measurement may comprise the energy level received by the network node 111 or by the wireless device 161 on the allocated D2D radio resources, or the signal detected by the network node 111 or by the wireless device 161 in the allocated D2D radio resources.

In some embodiments, the reconfiguration is further based on the fraction of the allocated D2D radio resources that is utilized for D2D communication in the radio communications network 100 wherein the network node 111 and the wireless device 161 operate. In these embodiments, the fraction may have been estimated by the network node 111, as described in action 202.

Action 404

The wireless device 161 adopts the received reconfiguration of the allocation of radio resources for D2D communications. This may be implemented, for example, by restricting the resources used for D2D communication to those configured by the network node 111.

In some embodiments, the adopting the received reconfiguration comprises one of: increasing the number of radio resources available for D2D traffic, and reducing the number of radio resources available for D2D traffic.

In some embodiments, the adopting may also further comprise one of: increasing the number of radio resources available for legacy cellular traffic, and reducing the number of radio resources available for legacy cellular traffic.

In any of the embodiments herein, the allocation of radio resources to the at least one wireless device 161 may be for scheduling discovery signals with at least one of the following types: a) Type 1, wherein radio resources for discovery signal transmission are allocated on a non-wireless device specific basis, b) Type 2, wherein radio resources for discovery signal transmission are allocated on a wireless device specific basis, c) Type 2A, wherein radio resources for discovery signal transmission are allocated for each specific transmission instance of discovery signals, and d) Type 2B, wherein radio resources for discovery signal transmission are semi-persistently allocated for discovery signal transmission.

Embodiments described herein may have the advantage of providing different approaches for detection of the load on D2D resources by the network node 111, including the case where the at least one D2D wireless device 161 may not be connected to the network node 111.

To perform the method actions described above in relation to FIGS. 2-3, the network node 111 is configured for adapting the allocation of radio resources to the at least one wireless device 161 for D2D communications. The network node 111 comprises the following arrangement depicted in FIG. 5. As stated earlier, the at least one wireless device 161 is configured to be located in the cell 121 configured to be served by the network node 111. The wireless device 161 and the network node 111 are configured to operate in the radio communications network 100. The detailed description of some of the following corresponds to the same references provided above, in relation to the actions described for the network node 111, and will thus not be repeated here.

In some embodiments, the wireless device 161 is configured to be in idle mode.

The network node 111 is configured to obtain the measurement of interference level on the allocated D2D radio resources to the at least one wireless device 161.

In some embodiments, this may be implemented by an obtaining module 501 comprised in the network node 111.

In some embodiments, the measurement comprises the energy level configured to be received by the network node 111 or the wireless device 161 on the allocated D2D radio resources, or the signal configured to be detected by the network node 111 or by the wireless device 161 in the allocated D2D radio resources.

In some embodiments to obtain the measurement comprises: to measure the energy level received on the number of allocated D2D radio resources, or to detect the signal in the allocated D2D radio resources. This may also be implemented by the obtaining module 501.

In some embodiments, to obtain the measurement comprises to receive the report from the wireless device 161 which report indicates the energy level received by the wireless device 161 on the allocated D2D radio resources, or the signal detected by the wireless device 161 in the allocated D2D radio resources. This may also be implemented by the obtaining module 501.

In some embodiments, the allocation of radio resources to the at least one wireless device 161 is for scheduling discovery signals with at least one of the following types: a) Type 1, wherein radio resources for discovery signal transmission are allocated on a non-wireless device specific basis, b) Type 2, wherein radio resources for discovery signal transmission are allocated on a wireless device specific basis, c) Type 2A, wherein radio resources for discovery signal transmission are allocated for each specific transmission instance of discovery signals, and d) Type 2B, wherein radio resources for discovery signal transmission are semi-persistently allocated for discovery signal transmission.

The network node 111 is configured to adapt the allocation of radio resources for D2D communications, based on the obtained measurement.

This may be implemented by an adapting module 502 comprised in the network node 111.

In some embodiments, to adapt comprises one of: to increase the number of radio resources available for D2D traffic, and to reduce the number of radio resources available for D2D traffic.

In some embodiments, to adapt comprises one of: to increase the number of radio resources available for legacy cellular traffic, and to reduce the number of radio resources available for legacy cellular traffic.

In some embodiments, the network node 111 may be further configured to estimate the fraction of the allocated D2D radio resources that is utilized for D2D communication in the radio communications network 100 wherein the network node 111 and the wireless device 161 are configured to operate.

This may be implemented by an estimating module 503 comprised in the network node 111.

In some embodiments, the network node 111 may be further configured to adapt based on the estimated fraction.

In some embodiments, the network node 111 may be further configured to signal to the wireless device 161 or the neighbor network node 112 the reconfiguration of the allocation of the radio resources for D2D communications, which reconfiguration is based on the adapted allocation of radio resources for D2D communications. The neighbor network node 112 is configured to operate in the wireless communications network 1.

This may be implemented by a signaling module 504 comprised in the network node 111.

In some embodiments, the network node 111 may be further configured to configure the wireless device 161 to send to the network node 111 the report comprising the energy level received by the wireless device 161 on the allocated D2D radio resources, or the signal detected by the wireless device 161 in the allocated D2D radio resources This may be implemented by a configuring module 505 comprised in the network node 111.

Figure 5:
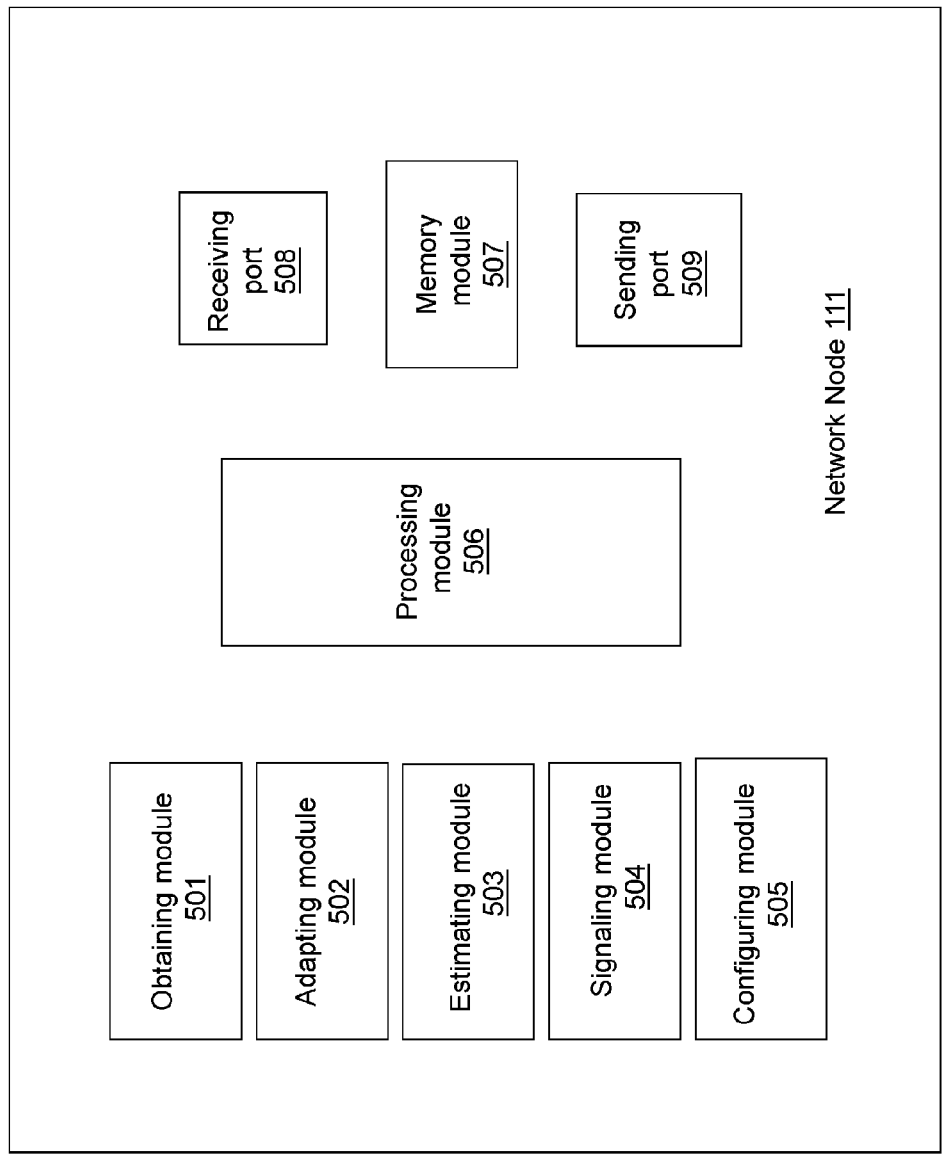
FIG. 5 is a schematic block diagram illustrating embodiments of a network node, according to embodiments herein.

The embodiments herein for adapting the allocation of radio resources to the at least one wireless device 161 for D2D communications may be implemented through one or more processors, such as the processing module 506 in the network node 111 depicted in FIG. 5, together with computer program code for performing the functions and actions of the embodiments herein. The program code mentioned above may also be provided as a computer program product, for instance in the form of a data carrier carrying computer program code for performing the embodiments herein when being loaded into the in the network node 111. One such carrier may be in the form of a CD ROM disc. It may be however feasible with other data carriers such as a memory stick. The computer program code may furthermore be provided as pure program code on a server and downloaded to the network node 111.

The network node 111 may further comprise a memory module 507 comprising one or more memory units. The memory module 507 may be arranged to be used to store data in relation to applications to perform the methods herein when being executed in the network node 111. Memory module 507 may be in communication with the processing module 506. Any of the other information processed by the processing module 506 may also be stored in the memory module 507.

In some embodiments, information may be received from, e.g., the wireless device 161, through a receiving port 508. In some embodiments, the receiving port 508 may be, for example, connected to one or more antennas in the network node 111. In other embodiments, the network node 111 may receive information from another structure in the radio communications network 100 through the receiving port 508. Since the receiving port 508 may be in communication with the processing module 506, the receiving port 508 may then send the received information to the processing module 506. The receiving port 508 may also be configured to receive other information.

The information processed by the processing module 506 in relation to the embodiments of the method herein may be stored in the memory module 507 which, may be in communication with the processing module 506, as stated earlier, and with the receiving port 508.

The processing module 506 may be further configured to transmit or send information to e.g., the wireless device 161, through a sending port 509, which may be in communication with the processing module 506, and the memory module 507.

Those skilled in the art will also appreciate that the different modules 501-505 described above may refer to a combination of analog and digital modules, and/or one or more processors configured with software and/or firmware, e.g., stored in memory, that, when executed by the one or more processors such as the processing module 506, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 501-505 described above may be implemented as one or more applications running on one or more processors such as the processing module 506.

Thus, the methods according to the embodiments described herein for the network node 111 are respectively implemented by means of a computer program product, comprising instructions, i.e., software code portions, which, when executed on at least one processor, cause the at least one processor to carry out the actions described herein, as performed by the network node 111. The computer program product may be stored on a computer-readable storage medium. The computer-readable storage medium, having stored thereon the computer program, may comprise instructions which, when executed on at least one processor, cause the at least one processor to carry out the actions described herein, as performed by the network node 111. In some embodiments, the computer-readable storage medium may be a non-transitory computer-readable storage medium, such as a CD ROM disc, or a memory stick.

To perform the method actions described above in relation to FIG. 4, the wireless device 161 is configured for adopting the reconfiguration of the allocation of radio resources to the at least one wireless device 161 for D2D communications. The wireless device 161 comprises the following arrangement depicted in FIG. 6. The wireless device 161 is configured to be located in the cell 121, which is configured to be served by the network node 111. The wireless device 161 and the network node 111 are configured to operate in the radio communications network 100. The detailed description of some of the following corresponds to the same references provided above, in relation to the actions described for the wireless device 161, and will thus not be repeated here.

In some embodiments, the wireless device 161 is configured to be in idle mode.

The wireless device 161 is configured to receive from the network node 111 the reconfiguration of the allocation of radio resources for D2D communications, the reconfiguration being based on the measurement of interference level on allocated D2D radio resources to the at least one wireless device 161 configured to be obtained by the network node 111.

In some embodiments, this may be implemented by a receiving module 601 comprised in the wireless device 161.

In some embodiments, the measurement comprises the energy level configured to be received by the network node 111 or by the wireless device 161 on the allocated D2D radio resources, or the signal configured to be detected by the network node 111 or by the wireless device 161 in the allocated D2D radio resources.

In some embodiments, the reconfiguration is further based on the fraction of the allocated D2D radio resources that is utilized for D2D communication in the radio communications network 100 wherein the network node 111 and the wireless device 161 are configured to operate, the fraction being configured to be estimated by the network node 111.

In some embodiments, the allocation of radio resources to the at least one wireless device 161 is for scheduling discovery signals with at least one of the following types: a) Type 1, wherein radio resources for discovery signal transmission are allocated on a non-wireless device specific basis, b) Type 2, wherein radio resources for discovery signal transmission are allocated on a wireless device specific basis, c) Type 2A, wherein radio resources for discovery signal transmission are allocated for each specific transmission instance of discovery signals, and d) Type 2B, wherein radio resources for discovery signal transmission are semi-persistently allocated for discovery signal transmission.

In some embodiments, the wireless device 161 may be further configured to receive the configuration from the network node 111 to send to the network node 111 the report comprising the measurement of interference level on allocated D2D radio resources to the at least one wireless device 161, the measurement comprising the measured energy level received by the wireless device 161 on the allocated D2D radio resources, or the signal detected by the wireless device 161 in the allocated D2D radio resources This may also be implemented by the receiving module 601.

The wireless device 161 is also configured to adopt the received reconfiguration of the allocation of radio resources for D2D communications.

This may be implemented by an adopting module 602 comprised in the wireless device 161.

In some embodiments, to adopt the received reconfiguration comprises one of: to increase the number of radio resources available for D2D traffic, and to reduce the number of radio resources available for D2D traffic.

In some embodiments, to adopt the received reconfiguration comprises one of: to increase the number of radio resources available for legacy cellular traffic, and to reduce the number of radio resources available for legacy cellular traffic.

In some embodiments, the wireless device 161 may be further configured to determine the measurement of interference level by being configured to one of: to measure the energy level configured to be received by the wireless device 161 on the number of allocated D2D radio resources, or to detect the signal in the allocated D2D radio resources.

This may be implemented by a determining module 603 comprised in the wireless device 161.

In some embodiments, the wireless device 161 may be further configured to send the report comprising the measurement of interference level on allocated D2D radio resources to the at least one wireless device 161 to the network node 111, the measurement comprising the measured energy level received by the wireless device 161 on the allocated D2D radio resources, or the signal detected by the wireless device 161 in the allocated D2D radio resources.

This may be implemented by a sending module 604 comprised in the wireless device 161.

Figure 6:
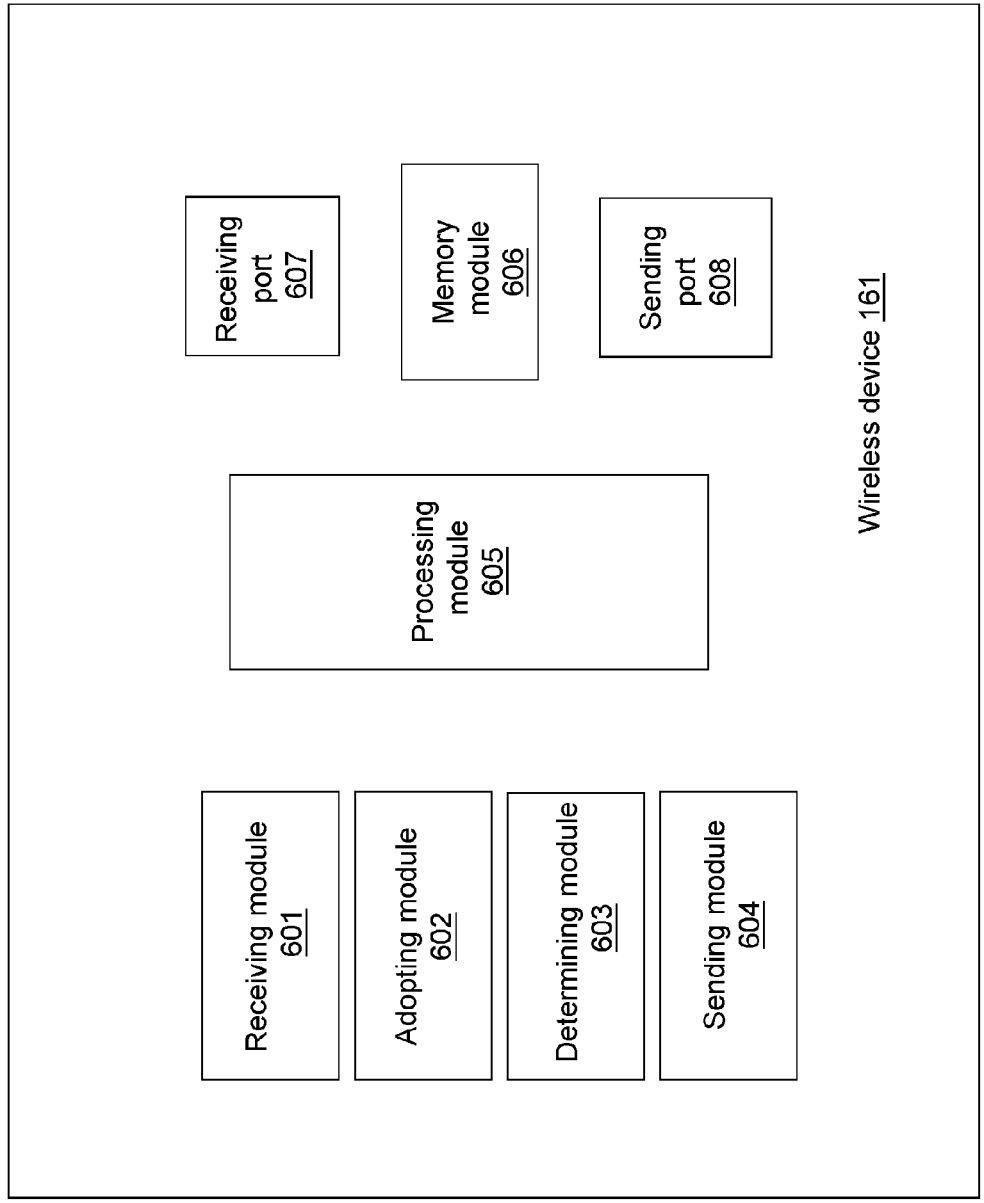
FIG. 6 is a schematic block diagram illustrating embodiments of a wireless device, according to embodiments herein.

The embodiments herein for adopting the reconfiguration of the allocation of radio resources to the at least one wireless device 161 for D2D communications may be implemented through one or more processors, such as the processing module 605 in the wireless device 161 depicted in FIG. 6, together with computer program code for performing the functions and actions of the embodiments herein. The program code mentioned above may also be provided as a computer program product, for instance in the form of a data carrier carrying computer program code for performing the embodiments herein when being loaded into the in the wireless device 161. One such carrier may be in the form of a CD ROM disc. It may be however feasible with other data carriers such as a memory stick. The computer program code may furthermore be provided as pure program code on a server and downloaded to the wireless device 161.

The wireless device 161 may further comprise a memory module 606 comprising one or more memory units. The memory module 606 may be arranged to be used to store data in relation to applications to perform the methods herein when being executed in the wireless device 161. Memory module 606 may be in communication with the processing module 605. Any of the other information processed by the processing module 605 may also be stored in the memory module 606.

In some embodiments, information may be received from, e.g., the network node 111, through a receiving port 607. In some embodiments, the receiving port 607 may be, for example, connected to the one or more antennas in the wireless device 161. In other embodiments, the wireless device 161 may receive information from another structure in the radio communications network 100 through the receiving port 607. Since the receiving port 607 may be in communication with the processing module 605, the receiving port 607 may then send the received information to the processing module 605. The receiving port 607 may also be configured to receive other information.

The information processed by the processing module 605 in relation to the embodiments of method herein may be stored in the memory module 606 which, as stated earlier, may be in communication with the processing module 605 and the receiving port 607.

The processing module 605 may be further configured to transmit or send information to e.g., the network node 111, through a sending port 608, which may be in communication with the processing module 605, and the memory module 606.

Those skilled in the art will also appreciate that the different modules 601-604 described above may refer to a combination of analog and digital modules, and/or one or more processors configured with software and/or firmware, e.g., stored in memory, that, when executed by the one or more processors such as the processing module 605, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 601-604 described above may be implemented as one or more applications running on one or more processors such as the processing module 605.

Thus, the methods according to the embodiments described herein for the wireless device 161 are respectively implemented by means of a computer program product, comprising instructions, i.e., software code portions, which, when executed on at least one processor, cause the at least one processor to carry out the actions described herein, as performed by the wireless device 161. The computer program product may be stored on a computer-readable storage medium. The computer-readable storage medium, having stored thereon the computer program, may comprise instructions which, when executed on at least one processor, cause the at least one processor to carry out the actions described herein, as performed by the wireless device 161. In some embodiments, the computer-readable storage medium may be a non-transitory computer-readable storage medium, such as a CD ROM disc, or a memory stick.

When using the word "comprise" or "comprising" it shall be interpreted as non-limiting, i.e. meaning "consist at least of".

The modules described may be for performing any of the pertinent embodiments described.

The embodiments herein are not limited to the above described preferred embodiments. Various alternatives, modifications and equivalents may be used. Therefore, the above embodiments should not be taken as limiting the scope of the invention.

ABBREVIATIONS

CDM Code division multiplexing
CH Cluster head
CRC Cyclic Redundancy Check
D2D Device-to-Device
eNB E-UTRAN Node B
eNB evolved Node B
ePDCCH evolved PDCCH
FDM Frequency Division Multiplex
LTE Long Term Evolution
MCS Modulation and Coding Scheme
NW Network
OAM Operation and Maintenance
PDCCH Physical Downlink Control Channel
PRB Physical Resource Block
RAN Radio Access Network
RRC Radio Resource Control
RRM Radio Resource Management
TA Tracking Area
TAU Tracking Area Update
TDM Time Division Multiplexing
UTRAN Universal Terrestrial Radio Access Network

The invention claimed is:

1. A method performed by a network node for adapting an allocation of radio resources to at least one wireless device for Device-to-Device, D2D, communications, the at least one wireless device being located in a cell served by the network node, the method comprising:
obtaining a measurement of interference level on allocated D2D radio resources to the at least one wireless device, the at least one wireless device being in idle mode,
adapting the allocation of radio resources for D2D communications based on the obtained measurement, the adapting comprising one of increasing a number of radio resources available for D2D traffic and reducing the number of radio resources available for the D2D traffic, the D2D traffic corresponding to wireless devices located in the cell being served by the network node that are in idle mode and consume allocated D2D radio resources, and
signalling to one of the at least one wireless device and a neighbor network node a reconfiguration of the allocation of radio resources for D2D communications, which reconfiguration is based on the adapted allocation of radio resources for D2D communications.

2. The method of claim 1, wherein the measurement comprises one of (a) an energy level received by one of the network node and the wireless device on the allocated D2D radio resources, and (b) a signal detected by one of the network node and by the wireless device in the allocated D2D radio resources.

3. The method of claim 1, further comprising estimating a fraction of the allocated D2D radio resources that is utilized for D2D communication in a radio communications network wherein the network node and the wireless device operate, and wherein the adapting is further based on the estimated fraction.

4. The method of claim 1, wherein the obtaining the measurement comprises one of: measuring an energy level received on a number of allocated D2D radio resources, and detecting a signal in the allocated D2D radio resources.

5. The method of claim 1, wherein the obtaining the measurement comprises one of receiving a report from the wireless device which report indicates an energy level received by the wireless device on the allocated D2D radio resources, and a signal detected by the wireless device in the allocated D2D radio resources.

6. The method of claim 1, wherein the allocation of radio resources to the at least one wireless device is for scheduling discovery signals with at least one of the following types: a) Type 1, wherein radio resources for discovery signal transmission are allocated on a non-wireless device specific basis, b) Type 2, wherein radio resources for discovery signal transmission are allocated on a wireless device specific basis, c) Type 2A, wherein radio resources for discovery signal transmission are allocated for each specific transmission instance of discovery signals, and d) Type 2B, wherein radio resources for discovery signal transmission are semi-persistently allocated for discovery signal transmission.

7. A method performed by a wireless device for adopting a reconfiguration of an allocation of radio resources to the at least one wireless device for Device-to-Device, D2D, communications, the wireless device being located in a cell served by a network node, the method comprising:
receiving from the network node the reconfiguration of the allocation of radio resources for D2D communications, the reconfiguration being signalled to one of the wireless device and a neighbor network node and the reconfiguration being based on an adapted allocation of radio resources for D2D communication and based on a measurement of interference level on allocated D2D radio resources to the at least one wireless device obtained by the network node, the at least one wireless device being in idle mode, and
adopting the received reconfiguration of the allocation of radio resources for D2D communications, the received reconfiguration comprising one of increasing a number of radio resources available for D2D traffic and reducing the number of radio resources available for the D2D traffic, the D2D traffic corresponding to wireless devices located in the cell being served by the network node that are in idle mode and that consume allocated D2D radio resources.

8. The method of claim 7, wherein the measurement comprises one of (a) an energy level received by one of the network node and the wireless device on the allocated D2D radio resources, and (b) a signal detected by one of the network node and by the wireless device in the allocated D2D radio resources.

9. The method of claim 7, further comprising determining the measurement of interference level by one of: measuring an energy level received on a number of allocated D2D radio resources, and detecting a signal in the allocated D2D radio resources, and sending a report comprising the measurement to the network node.

10. The method of claim 7, wherein the reconfiguration is further based on a fraction of the allocated D2D radio resources that is utilized for D2D communication in a radio communications network wherein the network node and the wireless device operate, the fraction having been estimated by the network node.

11. The method of claim 7, wherein the allocation of radio resources to the at least one wireless device is for scheduling discovery signals with at least one of the following types: a) Type 1, wherein radio resources for discovery signal transmission are allocated on a non-wireless device specific basis, b) Type 2, wherein radio resources for discovery signal transmission are allocated on a wireless device specific basis, c) Type 2A, wherein radio resources for discovery signal transmission are allocated for each specific transmission instance of discovery signals, and d) Type 2B, wherein radio resources for discovery signal transmission are semi-persistently allocated for discovery signal transmission.

12. A network node for adapting an allocation of radio resources to at least one wireless device for Device-to-Device, D2D, communications, the at least one wireless device being configured to be located in a cell configured to be served by the network node, the network node being configured to:
  obtain a measurement of interference level on allocated D2D radio resources to the at least one wireless device, the at least one wireless device being in idle mode,
  adapt the allocation of radio resources for D2D communications based on the obtained measurement, the adapting comprising one of increasing a number of radio resources available for D2D traffic and reducing the number of radio resources available for the D2D traffic, the D2D traffic corresponding to wireless devices located in the cell being served by the network node that are in idle mode and that consume allocated D2D radio resources, and
  signal to one of the at least one wireless device and a neighbor network node a reconfiguration of the allocation of radio resources for D2D communications, which reconfiguration is based on the adapted allocation of radio resources for D2D communications.

13. The network node of claim 12, wherein the measurement comprises one of (a) an energy level configured to be received by one of the network node and the wireless device on the allocated D2D radio resources, and (b) a signal configured to be detected by one of the network node and by the wireless device in the allocated D2D radio resources.

14. The network node of claim 12, further configured to estimate a fraction of the allocated D2D radio resources that is utilized for D2D communication in a radio communications network wherein the network node and the wireless device are configured to operate, and wherein the network node is further configured to adapt based on the estimated fraction.

15. The network node of claim 12, wherein to obtain the measurement comprises one of: to measure an energy level received on a number of allocated D2D radio resources, and to detect a signal in the allocated D2D radio resources.

16. The network node of claim 12, wherein to obtain the measurement comprises to receive a report from the wireless device which report indicates one of an energy level received by the wireless device on the allocated D2D radio resources, and a signal detected by the wireless device in the allocated D2D radio resources.

17. The network node of claim 12, wherein the allocation of radio resources to the at least one wireless device is for scheduling discovery signals with at least one of the following types: a) Type 1, wherein radio resources for discovery signal transmission are allocated on a non-wireless device specific basis, b) Type 2, wherein radio resources for discovery signal transmission are allocated on a wireless device specific basis, c) Type 2A, wherein radio resources for discovery signal transmission are allocated for each specific transmission instance of discovery signals, and d) Type 2B, wherein radio resources for discovery signal transmission are semi-persistently allocated for discovery signal transmission.

18. A wireless device for adopting a reconfiguration of an allocation of radio resources to the at least one wireless device for Device-to-Device, D2D, communications, the wireless device being configured to be located in a cell configured to be served by a network node, the wireless device being configured to:
  receive from the network node a reconfiguration of allocation of radio resources for D2D communications, the reconfiguration being signalled to one of the wireless device and a neighbor network node and the reconfiguration being based on an adapted allocation of radio resources for D2D communication and based on a measurement of interference level on allocated D2D radio resources to the at least one wireless device configured to be obtained by the network node, the at least one wireless device being in idle mode, and
  adopt the received reconfiguration of the allocation of radio resources for D2D communications, the received reconfiguration comprising one of increasing a number of radio resources available for D2D traffic and reducing the number of radio resources available for the D2D traffic, the D2D traffic corresponding to wireless devices located in the cell being served by the network node that are in idle mode and that consume allocated D2D radio resources.

19. The wireless device of claim 18, wherein the measurement comprises one of (a) an energy level configured to be received by one of the network node and by the wireless device on the allocated D2D radio resources, and (b) a signal configured to be detected by one of the network node and by the wireless device in the allocated D2D radio resources.

20. The wireless device of claim 18, further configured to determine the measurement of interference level by being configured to one of: to measure an energy level configured to be received by the wireless device on a number of allocated D2D radio resources, and to detect a signal in the allocated D2D radio resources.

21. The wireless device of claim 18, wherein the reconfiguration is further based on a fraction of the allocated D2D radio resources that is utilized for D2D communication in a radio communications network wherein the network node and the wireless device are configured to operate, the fraction being configured to be estimated by the network node.

22. The wireless device of claim 18, wherein the allocation of radio resources to the at least one wireless device is for scheduling discovery signals with at least one of the following types: a) Type 1, wherein radio resources for discovery signal transmission are allocated on a non-wireless device specific basis, b) Type 2, wherein radio resources for discovery signal transmission are allocated on a wireless device specific basis, c) Type 2A, wherein radio resources for discovery signal transmission are allocated for each specific transmission instance of discovery signals, and d) Type 2B, wherein radio resources for discovery signal transmission are semi-persistently allocated for discovery signal transmission.

* * * * *